May 28, 1957 W. A. BIERMANN 2,793,654
VALVE
Filed Nov. 8, 1954
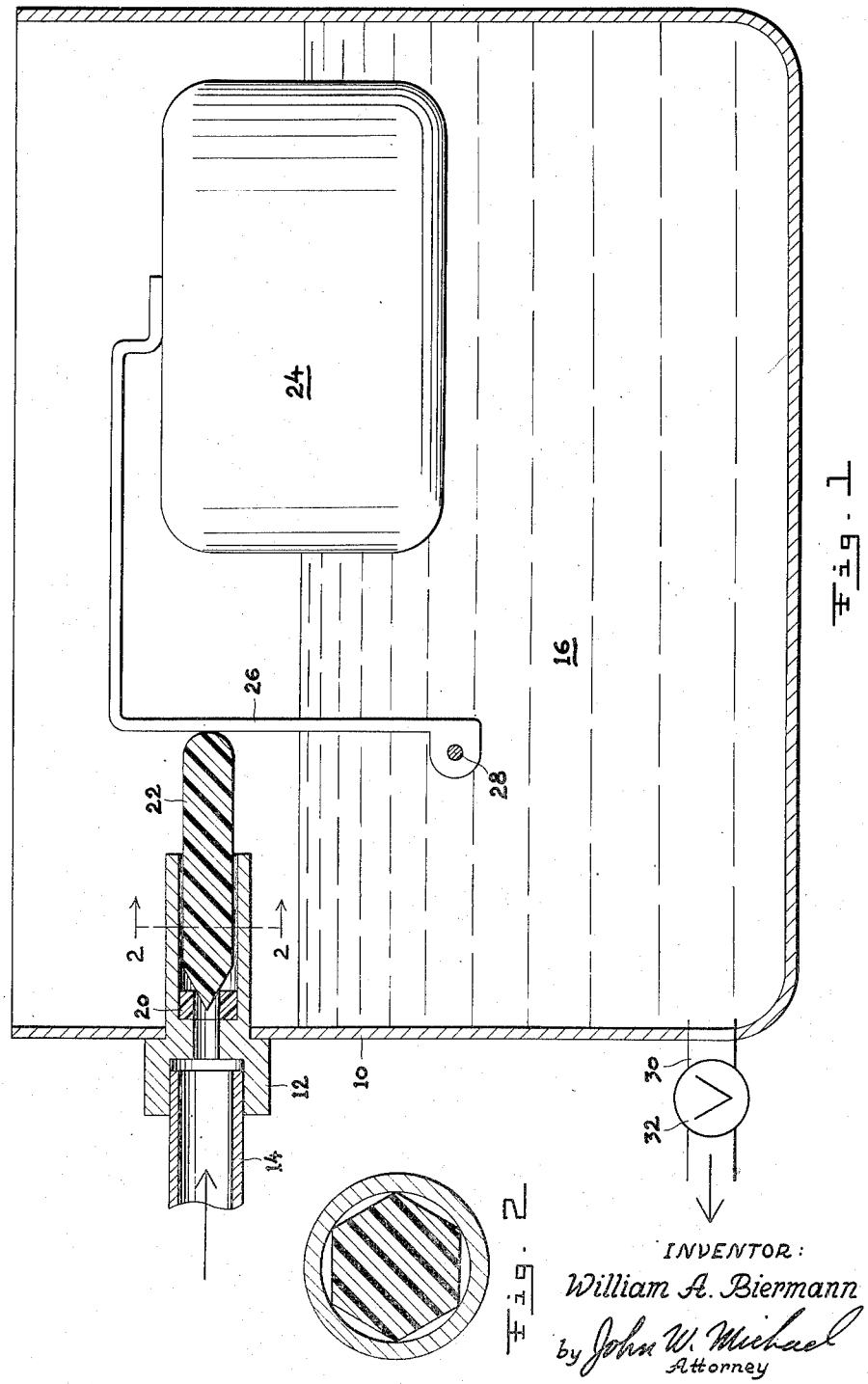
INVENTOR:
William A. Biermann
by John W. Michael
Attorney ପ୍ଟ
United States Patent Office 2,793,654
Patented May 28, 1957

2,793,654

VALVE

William A. Biermann, Milwaukee, Wis., assignor, by mesne assignments, to Controls Company of America, Schiller Park, Ill., a corporation of Delaware Application November 8, 1954, Serial No. 467,605

1 Claim. (Cl. 137—434)

This invention relates to a novel valve structure which insures complete interruption of flow even though the valve actually may not be seated. Through use of the present structure considerable savings in manufacturing costs can be realized and the useful life of the valve can be prolonged.

Valves used in float valves and the like have been made of stainless steel, brass or other metals and the valve must seat just about perfectly if complete shut-off flow is to be had with the small available force operating the valve. In order to obtain the required fit it has been the general practice to machine the valve and its seat as closely as possible and to then lap the valve to the seat. Even this procedure does not alway produce the desired fit and remachining of the parts is often required. The experience of applicant's assignee indicates that the cost of the remachining alone can be quite large.

The principal object of this invention is to provide a valve structure which does not require such a precise fit of the valve and its seat.

Another object is to provide a valve structure which will shut off flow even though the valve itself may not contact its seat.

Other objects and advantages will be pointed out in, or be apparent from, the specification and claim, as will obvious modifications of the single embodiment shown in the drawings in which:

Fig. 1 is a schematic showing of the present structure incorporated in a float valve assembly; and Fig. 2 is a section taken on line 2—2 of Fig. 1 to show the valve structure.

The schematic showing in Fig. 1 of the float chamber is not intended to be specific to any type of float control valve, but is intended to be a suitable representation of the device as it might be applied to a constant level oil control valve, to a carburetor, or to other allied uses in which the valve actuating force is not great and the pressure on the inlet to the control is not too great. The control casing 10 is provided with a valve body 11 having an inlet 12 to which the supply conduit 14, when connected, delivers oil or gasoline to the chamber 16 in such quantities as will maintain a constant level in the chamber.

A valve seat insert 20 is provided in body 11 while valve 22 is mounted for reciprocatory movement in the body to cooperate with the seat 20 in regulating the flow of oil into the casing. The motion is imparted to the valve 22 by means of float 24 and bell crank 26 pivotally mounted on pin 28 so that the vertical leg will act on the free end of the valve 22.

The casing 10 is also provided with an outlet 30 having a valve 32 therein for regulating flow from the chamber 16. In representing the valve 32 in the outlet, there is no intention on my part to limit this invention to use with such a valving arrangement. This invention is fully usable in constant level oil control valves wherein the outlet valve may be manually or thermostatically operated and is also fully useful in carburetors where the flow from the carburetor is regulated by the engine conditions obtaining in the float of the intake manifold. Therefore, the representation of valve 32 is to indicate only that there is some means for regulating the flow from the chamber 16.

It will be noted that the valve 22 and its seat 20 are located above the liquid level in chamber 16. Furthermore, instead of using the usual materials for the valve and the valve seat, the present invention calls for use of a material which is non-wettable in the liquid controlled by the valve. In the present case, my principal concern has been with petroleum products such as oil and gasoline. For handling such liquids, I have found that the plastic material marketed under the name Teflon and consisting of a tetrafluoroethylene polymer will serve the purpose admirably. When using Teflon in connection with a valve and seat wherein the valve seat is above the liquid level on the outlet side of the valve, complete seating of the valve on the valve seat is not necessary to interrupt flow. Thus, as the valve 22 approaches seat 20, there comes a point at which the surface tension of the liquid will act to prevent further flow even though the valve does not actually contact the seat. For example, with a valve and valve seat made of stainless steel a leakage rate of 6 to 8 ccs. per minute would be had with an eighteen inch head on the inlet. If the clearance between the valve and seat was .001 inch, by positioning the valve seat above the liquid level in the casing 16 and making the valve and seat out of Teflon, the same clearance will give no leakage and will support a nine foot head on the inlet. In both cases the liquid used is No. 1 fuel oil with a specific gravity of .8. The Teflon valve and valve seat will support an eighteen inch head with a clearance of .002 inch. From this it can be seen that a considerable error in seating the valve can be tolerated without any leakage, while the .001 inch error in the usual steel construction would allow a prohibitive leakage rate.

In the illustrated embodiment, the valve 22 could be positioned vertically if desired, and it is only important that the valve seat be above the liquid level. Since only by doing this can the non-wettable characteristic of the valve and valve seat come into play as the valve throttles the flow. If the seat were surrounded by liquid, there would be no opportunity for the non-wettable feature to function.

Although but one embodiment of the present invention has been illustrated and described, it will be apparent to those skilled in the art that various changes and modifications may be made therein without departing from the spirit of the invention or from the scope of the appended claim.

I claim:

Apparatus for controlling flow of liquid petroleum products, comprising, a casing having an inlet, a valve seat in the inlet, a valve cooperating with the seat to regulate flow into the casing, said seat and said valve being made of tetrafluoroethylene polymer, and means responsive to the liquid level in the casing for regulating said valve to maintain a given level in the casing, said level being below said valve seat the outlet side of the seat being exposed to the surrounding atmosphere when the valve is closed.

References Cited in the file of this patent

UNITED STATES PATENTS

| | | |
|---|---|---|
| 1,789,964 | Buehrer | Jan. 27, 1931 |
| 2,414,577 | Adair et al. | Jan. 21, 1947 |
| 2,636,508 | Resek et al. | Apr. 28, 1953 |
| 2,701,119 | Smith | Feb. 1, 1955 |
| 2,730,122 | Svirsky | Jan. 10, 1956 |

FOREIGN PATENTS

| | | |
|---|---|---|
| 701,027 | Great Britain | of 1953 |

OTHER REFERENCES

Textbook of Physical Chemistry, by Glasstone, published in 1946, page 482.

Colloid and Capillary Chemistry, By Freundlich, published in 1922, pages 16 and 158.